United States Patent

Ryss et al.

[15] 3,659,192

[45] Apr. 25, 1972

[54] A DEVICE FOR DETERMINING THE MINERAL COMPOSITION, SIZE AND LOCATION OF ORE DEPOSITS

[72] Inventors: Jury Samuilovich Ryss, 2 Murinsky prospekt, 14 kv. 39; Jury Grigorievich Bakhtin, ulitsa Generals Khazova, 45, kv. 66; Vladimir Mikhailovich Panteleimonov, Nevsky prospekt, 11/12, kv. 19; Alexei Illarionovich Alexeev, ulitsa Sedova, 87, korpusl, kv. 7, all of Leningrad, U.S.S.R.

[22] Filed: Oct. 7, 1969

[21] Appl. No.: 864,503

[52] U.S. Cl. ....................324/1

[51] Int. Cl. ....................G01v 3/02

[58] Field of Search ....................324/1, 9, 10

[56] References Cited

UNITED STATES PATENTS

| | | | |
|---|---|---|---|
| 2,104,440 | 1/1938 | Statham et al. | 324/1 |
| 2,190,320 | 2/1940 | Potapenko | 324/1 |
| 2,199,705 | 5/1940 | Karcher | 324/1 |
| 2,766,421 | 10/1956 | Wait et al. | 324/1 |
| 3,113,265 | 12/1963 | Woods et al. | 324/1 |

*Primary Examiner*—Gerard R. Strecker
*Attorney*—Holman & Stern

[57] ABSTRACT

An apparatus for geophysical prospecting of ore deposits which is provided with a means for a program change of the current intensity in the power supply circuit, said current producing successive electrochemical reactions on the surface of the ore body which are recorded in a measuring-and-recording unit simultaneously with the signals sent from a current intensity detector inserted into the power supply circuit for recording polarization curves which are used for determination of the mineral composition, location and dimensions of the ore body.

2 Claims, 5 Drawing Figures

A DEVICE FOR DETERMINING THE MINERAL COMPOSITION, SIZE AND LOCATION OF ORE DEPOSITS

The present invention relates to geophysical apparatus for investigating ore bodies featuring an electronic conductivity and, more particularly, the invention relates to devices for geophysical prospecting of ore deposits.

Known in the art are apparatus for geophysical prospecting of ore deposits comprising a power source with current-carrying electrodes forming a supply circuit and a measuring-and-recording unit with potential electrodes.

The known apparatus are disadvantageous in that they can be used only for detecting a zone of an ore body with an electronic conductivity and also for determining the shape of this zone and the depth of its occurence. These apparatus do not provide for determining the mineral composition of the ore body, the content of each mineral occurring therein and the dimensions of the ore body.

The ore bodies often occur in enclosing rocks having a high electronic conductivity and this hinders the application of the presently known geophysical prospecting apparatus.

An object of the present invention is to eliminate the abovementioned disadvantages.

The specific object of the invention is to provide an apparatus for geophysical prospecting of ore deposits which makes it possible to record not only the presence of electrochemical processes on the surface of the ore bodies when an electric current flows therethrough, but also the character and parameters of these electrochemical processes.

This object is attained by providing an apparatus for geophysical prospecting of ore deposits which includes a power source with current-carrying electrodes, forming a power supply circuit, and a measuring-and-recording unit with potential electrodes. According to the invention this apparatus comprises a means for a programmed change of the current intensity in the power supply circuit, which current excites electrochemical reactions on the surface of the ore body following each other in succession, a compensating voltage generator and a summing unit connected to the potential electrodes which take electric potential difference carrying the information about the electrochemical reactions and also connected to the measuring-and-recording unit for recording this information. The apparatus also comprises a current intensity detector inserted into the power supply circuit, the signals from this detector being applied to the compensating voltage generator and to the measuring-and-recording unit synchronously with the information about the electrochemical reactions for recording the polarizing curves which are used for determination of the mineral composition, location and dimension of the ore body.

Due to such a design of the inventive apparatus it is possible to determine the mineral composition, location and dimension of the ore bodies in their natural occurence.

The invention will be further described in detail by way of example with reference to the accompanying drawings, in which.

Figure 1:
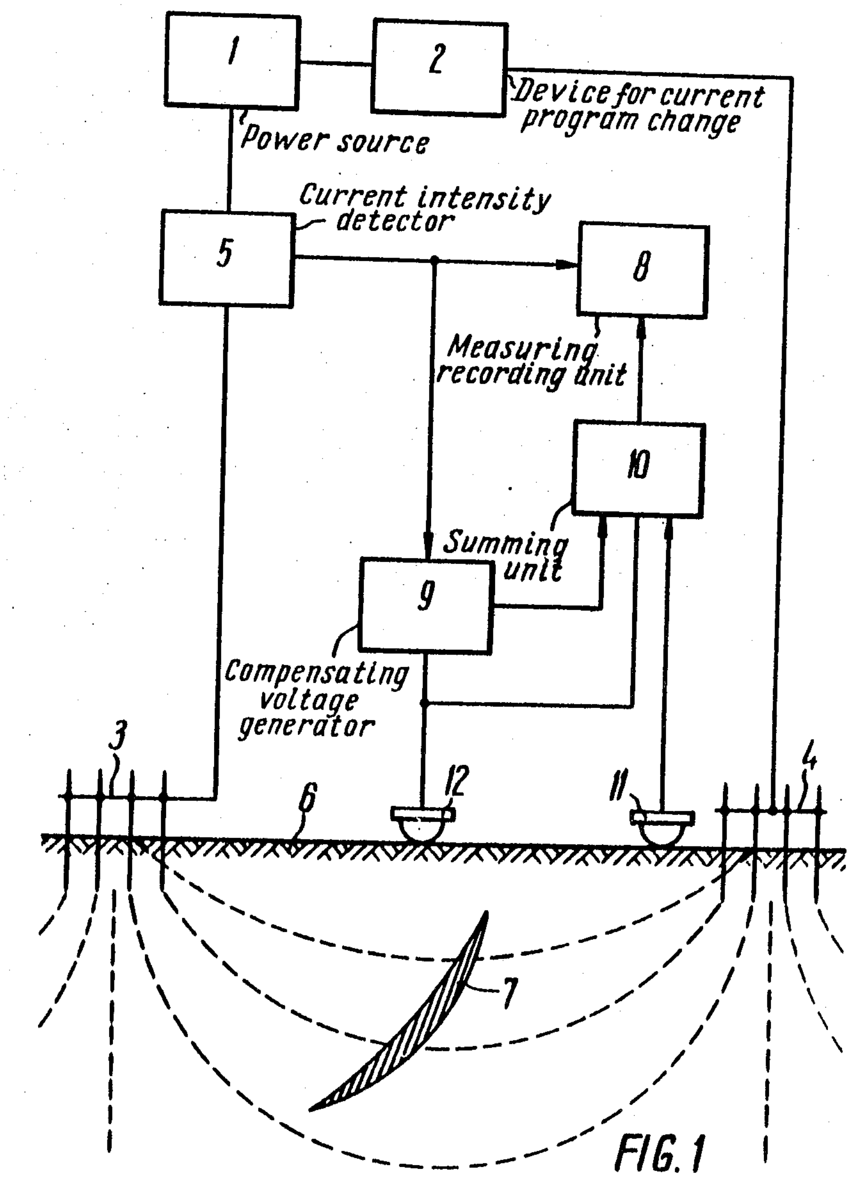
FIG. 1 is a block diagram of the proposed apparatus.

The apparatus according to the invention comprises a power source (FIG. 1) with a device 2 for a program change of the current in a power supply circuit, which current excites time-successive electrochemical reactions on the surface of the ore body; a current intensity detector 5 connected in series with the power source 1, and electrodes 3 and 4 which together with the enclosing rocks 6 and the prospected ore body 7 form a power supply circuit.

The current intensity detector 5 is connected to a measuring and recording unit 8 and to a compensating voltage generator 9 which, in turn, is connected to a summing unit 10, connected to the nonpolarizing potential electrodes 11 and 12 and with the measuring-and-recording unit 8.

The power source 1 with the program changing means 2 is a rectifier provided with a regulator, the output voltage of the rectifier being automatically changed under a prescribed program so that a current in a power supply circuit is changed according to the sane program. The current-carrying electrodes 3 and 4 provide for an electric current flowing through a closed circuit from the power source 1 through the enclosing rocks 6 and the ore body 7 being prospected.

Figure 2:
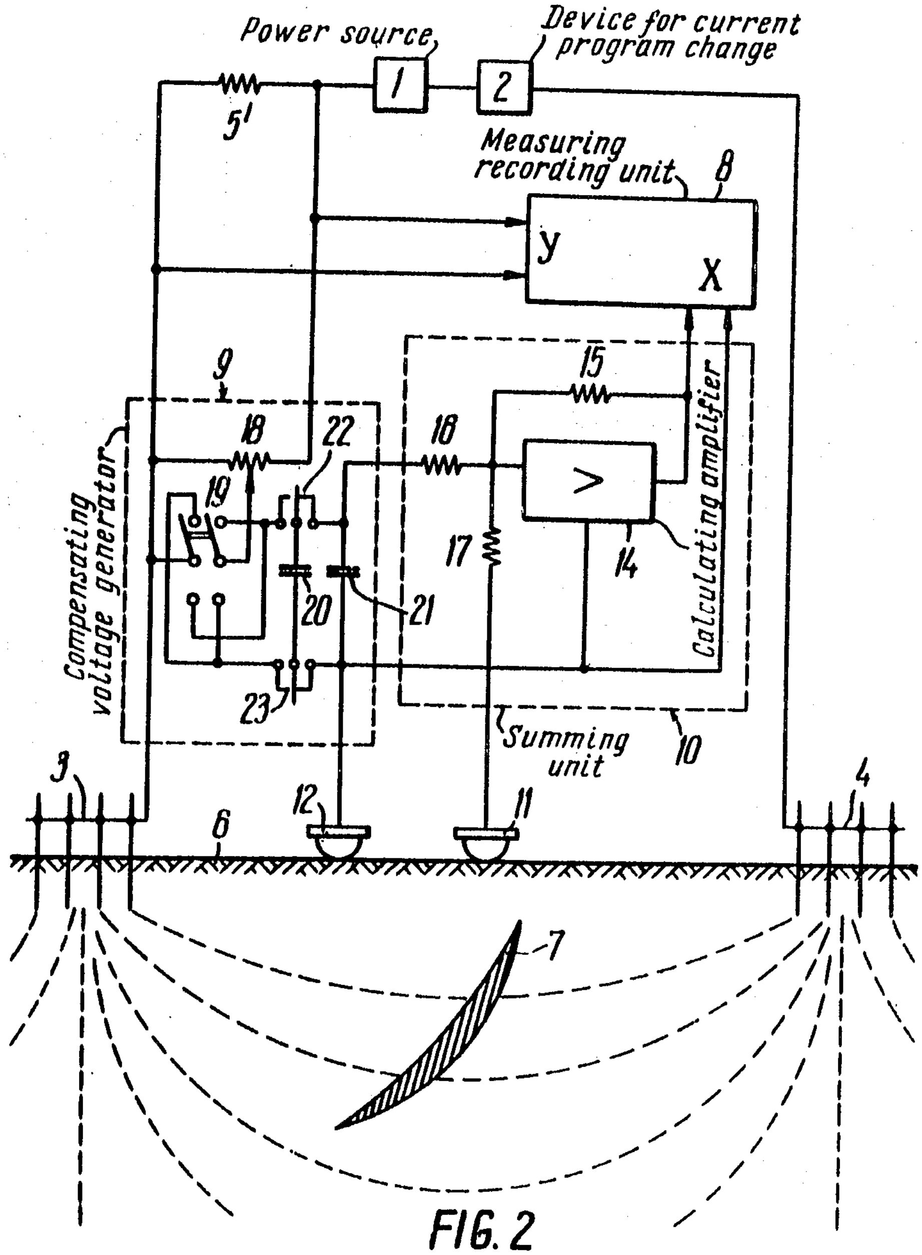
FIG. 2 is a schematic circuit diagram of the same apparatus.

The first embodiment of the invention is an apparatus intended for geophysical prospecting of ore deposits with an inaccessible ore body 7 as shown in FIG. 2.

Figure 3:
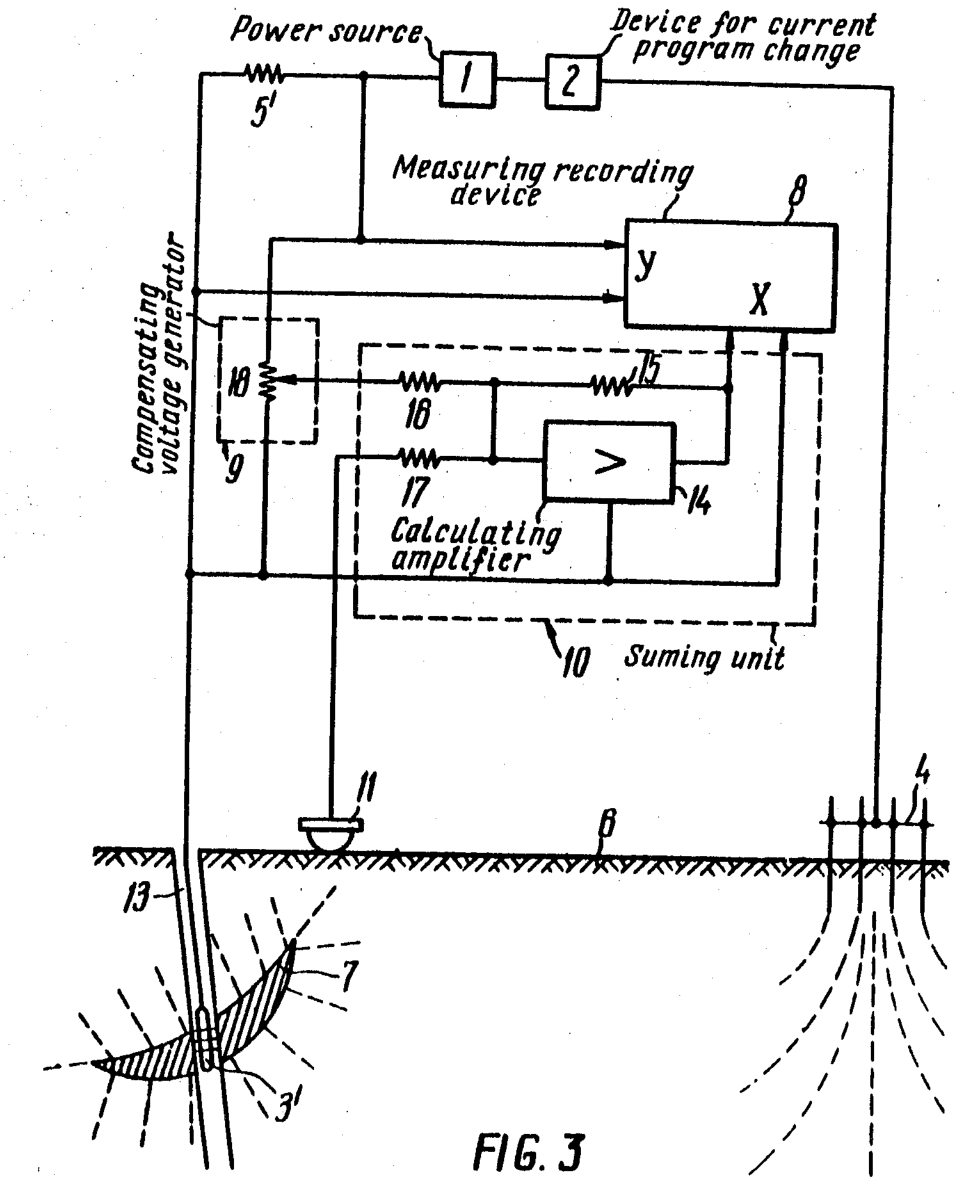
FIG. 3 is a schematic diagram of an alternate embodiment of the same apparatus.

According to the second embodiment, the apparatus is employed for geophysical prospecting of ore deposits whose ore body 7 is featured by a limited access, for example, a well 13 is drilled, through which a current-carrying electrode 3′ is lowered directly into the ore body 7, as shown in FIG. 3.

In the first and second versions of the proposed apparatus the current intensity detector 5 is accomplished in the form of a precision fixed resistor 5′ (FIGS. 2, 3) capable of dissipating high power without any change of its parameters.

The measuring and recording system of the unit 8 is calibrated along the axis of abscissae for measuring the current in the power supply circuit, while along the axis of ordinates this unit is calibrated for measuring the voltage. The input Y of the unit 8 is connected to opposite sides of the resistor 5′, while the input X is connected to the output of the unit 10.

The summing unit 10 comprises a calculating amplifier 14 with a feedback resistor 15 and with summing resistors 16 and 17.

In the first version of the proposed apparatus the compensating voltage generator 9 includes a variable resistor 18 (FIG. 2) for selecting the value of the output voltage of the generator 9 (or for changing its amplification factor), a reversing switch 19 for changing the polarity of the output voltage, capacitors 20 and 21 and a commutating relay whose contacts 22 and 23 provide for transmission of the compensating voltage from the variable resistor 18 to the capacitor 21 without galvanic coupling between these elements.

In the second version of the apparatus, the compensating voltage generator 9 is in fact a variable resistor 18 (FIG. 3), serving for changing the output voltage of this generator.

The principle of the operation of the proposed apparatus consists in the following.

Electrochemical reactions are excited on the surface of the ore body when electric current is being passed therethrough.

For successive excitation of various electrochemical reactions, the current flowing through the ore body is to be changed according to a prescribed program.

The nonpolarizing potential electrodes measure the difference of the electric potentials in the corresponding points of the enclosing rock. The measured potential difference comprises the voltage with the useful information about a character of the electrochemical reaction and the interference voltage which appears on the ore body in the enclosing rock during the flow of the current. The value of the interference voltage is often 2 to 3 orders higher than the value of the voltage with the information about the electrochemical reactions, the value of the latter voltage being often not higher than dozens of millivolts. The voltage with the information about the electrochemical reactions is recorded in the form of graphs (polarization curves) in the measuring-and-recording unit so that each value of the current corresponds to the value of the potential of the electrochemical reaction at a given moment. The voltage proportional to the potential of the electrochemical reaction and applied to the measuring-and-recording unit is developed at the output of the summing unit whose input is supplied with the voltages from the nonpolarizing potential electrodes and from the compensating voltage generator. The compensating voltage generator produces the voltage changing according to the same program by which there is changed the current flowing through the ore body. The value of the compensating voltage is equal to the interference voltage between the nonpolarizing potential electrodes but is of the opposite polarity.

Thus the recording of the polarization curves makes it possible to draw certain conclusions about the mineral composition, location and dimensions of the ore body.

Described below are concrete examples of operation of different versions of proposed apparatus. The apparatus in the form of the first version (FIG. 1) operates as follows.

Figure 4:
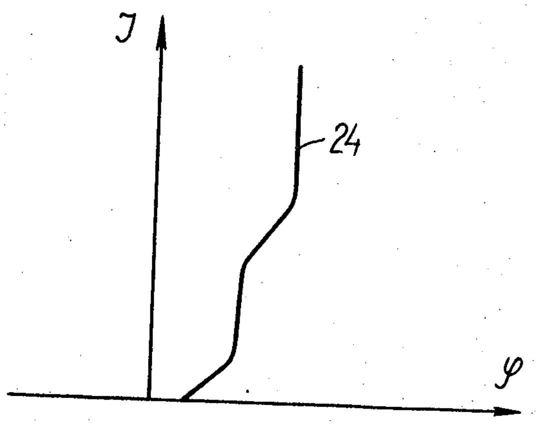
FIG. 4 is a typical polarization curve obtained by means of the apparatus shown in FIG. 3.

On passing a direct current of a variable intensity through the circuit: power source 1, resistor 5', current-carrying electrode 3, enclosing rocks 6 together with the ore body 7, current-carrying electrode 4 and means 2 for programmed changing the current intensity, a portion of the total current will flow through the ore body 7 under prospecting, which will excite electrochemical reactions on the surface of the ore body 7, each such reaction being characterized by the potentials and current arising between the non-polarizing electrodes 11 and 12. By introducing into the voltage being measured the compensating voltage from the generator 9 for taking into account the interference when the current passes through the enclosing rocks 6, at the output of the summing unit 10 the value of potentials is obtained, which characterize the electrochemical process taking place at the border between the ore body 7 and the enclosing rock 6. By registering with the help of the measuring and registering system of the unit 8 the values of current and potentials in the form of a graph $\phi=f(I)$, as shown in FIG. 4, in which the values of the potentials ($\phi$) are plotted along the axis of abscissae, while the values of the current intensity (I) are plotted along the axis of ordinates, we will have a polarization curve 24 which is used for determination of the mineral composition and dimensions of the ore body 7 being studied.

With the help of the compensating voltage generator 9 the interference is taken into account in the following manner. From the non-polarizing electrodes 11 and 12 to the input of the summing unit 10 there is applied the sum of two voltages $V=U_1+\phi'$, where $U_1$ is the interference voltage proportional to the intensity of the flowing current, and $\phi'$ is the difference proportional to the potentials of the reactions.

During the change of the current from zero to a certain value and at the zero compensating voltage which is set by adjusting the generator 9, a polarization curve 25 (FIG. 5) is recorded in the measuring-and-recording unit 8. This curve is strongly elongated along the axis of abscissae and is inconvenient for decoding. It is a necessary to record the polarization curve with a minimum of distortions caused by the interference voltage $U_1$. For this purpose the variable resistor 18 is used for setting a definite value of the output voltage of the generator 9, while the switch 19 is employed for setting the polarity of the output voltage which through the capacitor 20 and the vibrating contacts 22 and 23 of the relay is applied to the capacitor 21 serving as an output element of the compensating voltage generator 9.

The contacts 22 and 23 of the switching relay are energized by the application of alternating or pulsed voltage to the winding (not shown) of the switching relay. The value and shape of the voltage and the pulse frequency are not of principal importance in the consideration of the idea of the present invention. With voltage available at the relay winding, the contacts 22 and 23 connect the capacitor 20 to the capacitor 21, the former transferring a part of its charge to the latter. The charge transfer process during the oscillating movement of the contacts 22 and 23 will continue until the voltage across the capacitor 21 becomes equal to the voltage which is used to charge the capacitor 20 from the current flowing through the variable resistor 18.

The summing unit 10 is fed with the voltage U from the non-polarizing potential electrodes 11 and 12 through the summing resistor 17 and with the compensating voltage $U_2$ from the output of the generator 9 through the summing resistor 16.

In the process of changing of the current, in the power supply circuit, a voltage is developed at the output of the summing unit 10, which voltage is equal to the algebraic sum of the interference voltage $U_1$ compensating voltage $U_2$ with the polarity opposite to that of the interference voltage, and the potential difference $\phi'$, proportional to the potentials of the electrochemical reactions. The resultant of the algebraic summation of these voltages from the output of the unit 10 is applied to the input X of the measuring-and-recording unit 8, the input Y of the unit 8 being simultaneously fed with the voltage from the resistor 5' for registering the intensity of the flowing current.

If the output compensating voltage $U_2$ of the generator 9 is less than the interference voltage $U_1$, a polarization curve 26 is recorded in the measuring-and-recording unit 8. If $U_2 > U_1$, a curve 27 is recorded. When operating the proposed apparatus it is desirable to obtain the curve 28 recorded under the condition $U_1 = U_2$, since in this case correct information that can easily be processed is obtained. The last condition is selected by making a few polarization curves with different values of the compensating voltage of the generator 9. In case of the selected value $U_2<U_1$, and in view of the curve 26 recorded, the value of $U_2$ is increased. If the new value of $U_2$ exceeds $U_1$, the value of $U_2$ is decreased following the recording of the curve 27. A few successive approximations will help arrive at the curve 28 whose shape satisfies the condition $U_2 = U_1$.

Figure 5:
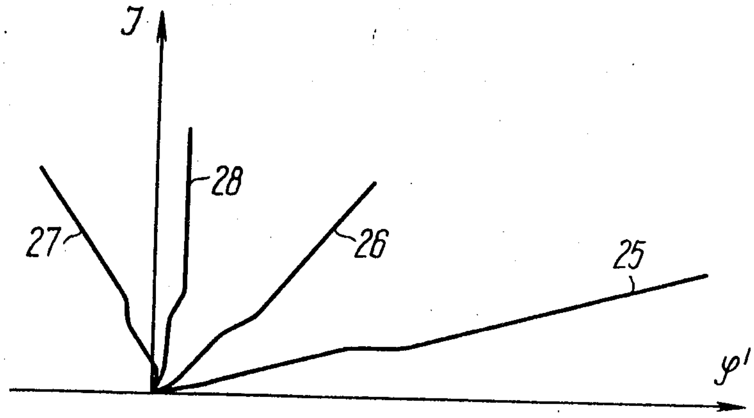
FIG. 5 represents the polarization curves obtained by means of the apparatus shown in FIG. 2.

In FIG. 5 for plotting the curves 25, 26, 27 and 28, the values of the algebraic sum of the interference voltage, compensating voltage and potential ($\phi'$) proportional to the values of the reaction potentials $\phi$, are plotted against the axis of abscissae in FIG. 5, while the values of the current intensity (I) are plotted against the axis of ordinates.

When arranging the current-carrying electrodes 3 and 4 on the earth surface at a certain distance from the electrodes 11 and 12, a current may appear between the electrodes 3 and 12 due to the energy of the power source 1, which current will be much higher than the permissible one, and the electrodes will become damaged. To keep the non-polarizing electrodes in good condition, the compensating voltage generator 9 is provided with a d.c. galvanic decoupling circuit inserted between the input and output of the generator, said input being fed by the voltage from the resistor 5' inserted into the power supply circuit.

In the proposed version of the compensating voltage generator 9 the galvanic decoupling is effected by means of the capacitor 20 which through the relay contacts 22 and 23 is alternately connected either to the variable resistor 18 via the switch 19 and is charged, or to the capacitor 21 and is partially discharged therethrough. This process runs until the voltage of the capacitor 21 becomes equal to the compensating voltage $U_2$ taken from the variable resistor 18.

The apparatus according to the second embodiment of the present invention (FIG. 3) operates as follows.

By means of the electrode 3' electric current is passed through the ore body 7 so that the current intensity consecutively varies and chemical reactions are excited on the surface of said ore body 7. Through the electrode 3' in the ore body 7 and the non-polarizing electrode 11, with taking into account the compensation of the interference voltage by the voltage of the generator 9, the algebraic sum of the voltages is measured, which in this case is equal directly to the potentials of the reactions taking place on the boundary of the ore body 7 and the enclosing rocks 6.

By the apparatus of the present invention the values of the current intensity and potentials are recorded as polarization curves, which curves serve for establishing the mineral composition and size of the ore body 7.

Inasmuch as one of the current electrodes and one of the potential non-polarizing electrodes are combined into a single current-carrying electrode 3', located, as described above, inside the ore body 7 being investigated, neither galvanic decoupling of the input and output of the compensating voltage generator 9, nor change in the polarity of the output voltage are required.

The sequence of recording polarization curves and the interaction of the individual units of the apparatus remain unchanged.

In this case the shape of the polarization curves does not depend on the position of the non-polarizing potential electrode 11, and due to this fact the processing of the obtained data becomes simpler and quicker. Shown in FIG. 4 is the polarization curve 24 obtained by means of present apparatus, which is used for determining the mineral composition and dimensions of the ore body 7 under prospecting.

The proposed apparatus makes it possible within a comparatively short time and either without drilling operations or with very limited drilling operations to determine the mineral composition of the ore body, its dimensions and location. The prospecting of ore bodies with the help of the present apparatus makes it possible to reduce the scope of drilling operations by a factor of 1.5–2, and improve the quality of prospecting jobs.

We claim:

1. A device for determining the mineral composition, size and location of ore deposits in an enclosing medium, comprising in combination a current source, current-carrying electrodes arranged in the enclosing medium and electrically connected to said current source to form a supply circuit therewith; means connected in said supply circuit at the output of said current source for effecting programmed changes in the intensity of current flowing through said supply circuit, said current causing successive electrochemical reactions on the surface of the ore body; a current intensity detector connected in said supply circuit; a compensating voltage generator generating a voltage proportional to the current flowing in the supply circuit and electrically connected to the output of said current intensity detector; a summing unit connected to said compensating voltage generator; non-polarizing measuring electrodes arranged in the enclosing medium and taking the electric potential difference and connected to said summing unit, wherein the voltage generated by said compensating voltage generator is subtracted from said electric potential difference to obtain the values of potentials of the electrochemical reactions; a measuring and recording unit fed synchronously with signals from said current intensity detector and from said summing unit for recording electrochemical curves, said electro-chemical curves being used for determining the mineral composition, location and size of the ore body.

2. A device for determining the mineral composition, size and location of ore deposits in an enclosing medium, comprising in combination a current source; current-carrying electrodes electrically connected to said source to form a supply circuit therewith, one of said electrodes being arranged in the enclosing medium and the other, in the ore body; means connected in said supply circuit at the output of said current source for effecting programmed changes in the intensity of current flowing through said supply circuit, said current causing successive electrochemical reactions on the surface of the ore body; a current intensity detector connected in said supply circuit; a compensating voltage generator generating a voltage proportional to the current flowing in the supply circuit and electrically connected to the output of said current intensity detector; a summing unit connected to the compensating voltage generator; receiving electrodes, one of which is a measuring electrode and is disposed in the ore body, while the others are non-polarizing electrodes and are arranged in the enclosing medium, said electrodes taking the electric potential difference and being connected to said summing unit, wherein the voltage generated by said compensating voltage generator is subtracted from said electric potential difference to obtain the values of potentials of said electrochemical reactions; a measuring and recording unit fed synchronously with signals from said current intensity detector and from said summing unit for recording electrochemical curves, said electrochemical curves being used for determining the mineral composition, location and size of the ore body.

* * * * *